(12) United States Patent
Nathanson

(10) Patent No.: US 9,120,257 B2
(45) Date of Patent: Sep. 1, 2015

(54) COMPOSITE CARRIER FRAME FOR PLASTIC INJECTION MOLDING

(71) Applicant: Apple Inc., Cupertino, CA (US)

(72) Inventor: Scott M. Nathanson, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 126 days.

(21) Appl. No.: 13/740,089

(22) Filed: Jan. 11, 2013

(65) Prior Publication Data

US 2014/0199422 A1 Jul. 17, 2014

(51) Int. Cl.
*B29C 45/14* (2006.01)
*G06F 1/16* (2006.01)
*B29L 31/34* (2006.01)

(52) U.S. Cl.
CPC ..... *B29C 45/14065* (2013.01); *B29C 45/14008* (2013.01); *B29C 45/14655* (2013.01); *G06F 1/1626* (2013.01); *B29C 45/14016* (2013.01); *B29L 2031/3481* (2013.01); *Y10T 29/49* (2015.01)

(58) Field of Classification Search
CPC .................. B29C 45/14008; B29C 45/14196; B29L 2031/3481
USPC .......................................................... 29/855
See application file for complete search history.

(56) References Cited

U.S. PATENT DOCUMENTS

| | | | |
|---|---|---|---|
| 4,337,574 A * | 7/1982 | Hughes et al. | 264/272.11 |
| 4,675,989 A | 6/1987 | Galloway et al. | |
| 5,023,202 A * | 6/1991 | Long et al. | 29/827 |
| 5,706,952 A | 1/1998 | Bianca et al. | |
| 6,244,899 B1 | 6/2001 | Bogursky et al. | |
| 7,385,288 B2 | 6/2008 | Boggs et al. | |
| 7,906,730 B2 | 3/2011 | Atkinson et al. | |
| 8,057,723 B2 | 11/2011 | Takeda et al. | |
| 2008/0272509 A1 | 11/2008 | Sakai | |

* cited by examiner

*Primary Examiner* — Alison Hindenlang
(74) *Attorney, Agent, or Firm* — Downey Brand LLP

(57) ABSTRACT

Methods and devices for forming a composite carrier frame assembly used in an injection molding process are described. Methods and devices described herein are well suited for insert molding multiple small pieces into a single injection molded part. The composite carrier frame assembly can include a number of insert attached thereto that are positioned in a pre-determined arrangement such during an injection molding process the inserts are molded in a molded part in the pre-determined arrangement. Each insert can include an anchor portion arranged to be molded in the single injection molded part and an exterior portion arranged to be positioned exterior to the single injection molded part.

24 Claims, 7 Drawing Sheets

COMPOSITE CARRIER FRAME FOR PLASTIC INJECTION MOLDING

FIELD OF THE DESCRIBED EMBODIMENTS

The described embodiments relate generally to injection molding processes and more particularly to techniques for injection molding inserts into workpieces in a manufacturing setting.

BACKGROUND

Injection molding is a common manufacturing process for producing plastic parts. Typically, material is fed into a heated barrel, mixed, and forced into a mold cavity where it cools and hardens to the configuration of the cavity. The molds are usually made of metal and precision-machined to form the features of the desired part. Injection molding is widely used for manufacturing a variety of parts, from the smallest component to entire body panels of cars.

In some applications, the plastic is molded over inserts to form a composite part. For example, the plastic can be molded around a stamped and formed metal part to form a composite plastic and metal part. The metal inserts can be, for example, a conductive lead, a fastener or a bushing. The result is a tightly bonded insert in the plastic part. By combining the physical strength of resin and metal inserts, insert molding can yield smaller and lighter components compared to parts manufactured using adhesive or soldering techniques. If multiple inserts are molded in a single injection molded part, however, it can be labor intensive to align each of the inserts with respect to each other and to dimensions of the finished product. Often this requires the manual alignment of each of the inserts in the mold prior to the injection process. The manual alignment can be more difficult if the inserts are very small and difficult to handle. If the dimension tolerances are very tight, this alignment process can be a significant factor in the production efficiency of the overall manufacturing process.

SUMMARY

This paper describes various embodiments that relate to improved insert molding processes. Methods and devices for providing multiple pieces into a single injection molded part are described.

According to one embodiment, a composite carrier frame assembly having a set of inserts configured to be molded into a single injection molded part is described. Each insert can have a corresponding anchor portion, exterior portion and connector. Each anchor portion can be arranged to be molded in the single injection molded part and each exterior portion can be arranged to be positioned exterior to the single injection molded part. The composite carrier frame assembly also includes a carrier frame configured to support the set of inserts in a predetermined arrangement. Each insert can be connected to the carrier frame via each corresponding connector. The carrier frame can include an index feature corresponding to the set of inserts and be configured to align the set of inserts during the injection molding process. The carrier frame also includes an opening configured to accommodate the mold during the injection molding process, where each anchor portion is positioned in the opening such that each anchor portion is situated inside the mold during the injection molding process.

According to another embodiment, a composite carrier frame assembly having a number of sets of flat attachment features is described. Each set of flat attachment features can be configured to attach the single injection molded part to a matching part as part of a housing for an electronic device. Each set of flat attachment features can be configured to be insert molded into a single injection molded part. In addition, each flat attachment feature can have a corresponding anchor portion, exterior portion and connector. The anchor portions can each be arranged to be positioned inside a mold during an injection molding process and the exterior portions can each be arranged to be positioned outside of the mold during the injection molding process. The composite carrier frame also includes a carrier frame which is configured to support the number of sets of flat attachment features in a predetermined arrangement. Each flat attachment feature can be connected to the carrier frame via each corresponding connector. The carrier frame includes a number of feed holes arranged in rows parallel to edges of the carrier frame and configured to engage with pins of a mechanical advancing device of an injection molding machine. Mechanical advancing devices can include, for example, one or more sprockets or hydraulically and/or pneumatically driven mechanical devices. During an injection molding process, movement of the mechanical advancing device causes the feed holes to engage with the pins to progress the composite carrier frame assembly though the injection molding machine such that one set of flat attachment features is injection molded into a single injection molded part at a time. The carrier frame also includes an opening configured to accommodate the mold during the injection molding process where each anchor portion is positioned in the opening such that it is situated inside the mold during the injection molding process.

According to another embodiment, a method for forming a composite carrier frame assembly used in an injection molding process is described. The method includes forming a number of sets of inserts configured to be insert molded into a single injection molded part where each insert has a corresponding anchor portion, exterior portion and connector. The method also includes forming a carrier frame from a strip of material, the carrier frame having a number of openings with each opening corresponding to an associated set of inserts. Each opening can be configured to accommodate the mold during the injection molding process. Each insert is also positioned in the opening such that each anchor portion is situated inside a mold and each exterior portion is situated outside of the mold during the injection molding process. The method also includes forming a number of feed holes in the carrier frame. The feed holes can be arranged in rows parallel to edges of the carrier frame. The rows of feed holes can be configured to engage with pins of a mechanical advancing device of an injection molding machine, where movement of the mechanical advancing device causes the feed holes to engage with the pins to progress the composite carrier frame assembly though the injection molding machine during an injection molding process such that one set of inserts is injection molded into a single injection molded part at a time.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1A:
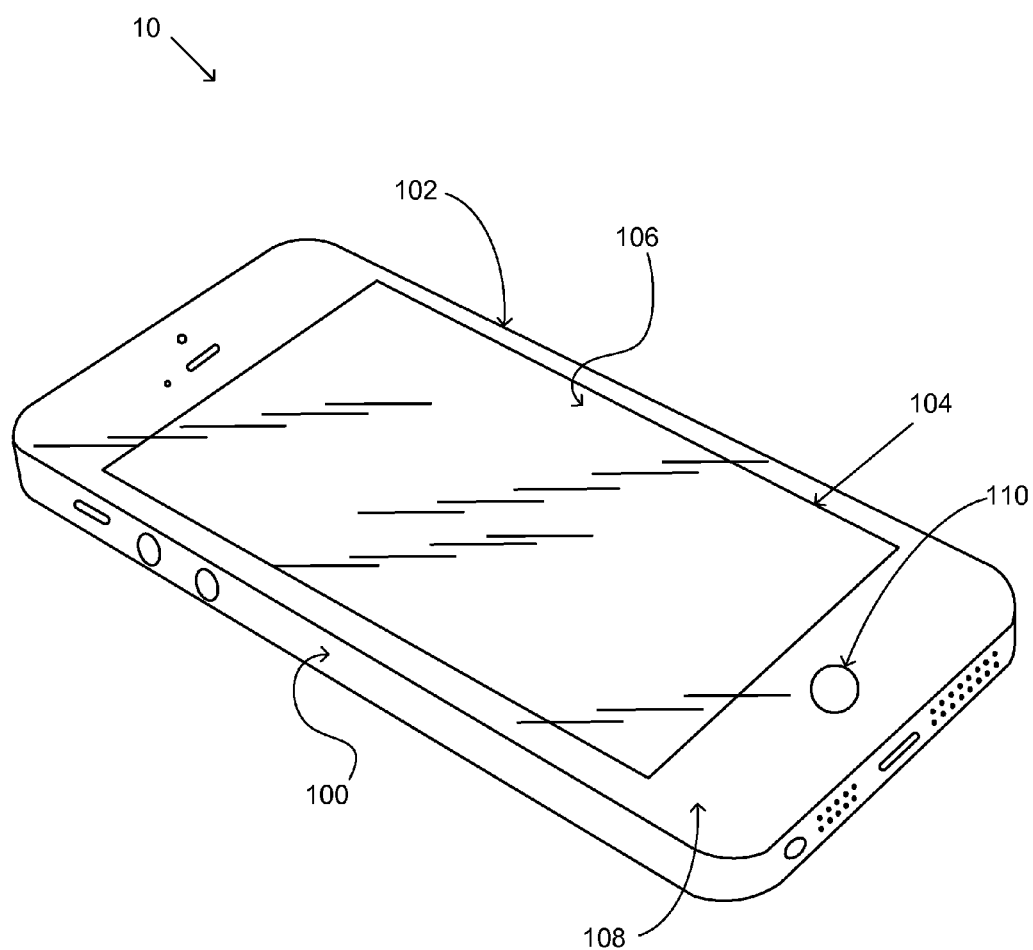
FIG. 1A shows an isometric view of portable electronic device in an assembled state.

Described herein are methods and apparatuses for improving insert molding processes. In particular, methods described can be used to improve the manufacture of injection molded parts that involve injection molding multiple inserts in a single part. Methods described are well suited in the manufacture of plastic molded parts of electronic devices including desktop computers, laptop computers, smart phones and media players, such as those designed and sold by Apple Inc. headquartered in Cupertino, Calif. FIG. 1A shows a perspective view of a fully assembled portable electronic device 10 in accordance with an embodiment described herein. Portable electronic device 10 can be sized for one-handed operation and placement into small areas such as a pocket, i.e., portable electronic device 10 can be a handheld pocket sized electronic device. By way of example, the portable electronic device 10 may correspond to a computer, media device, telecommunication device and/or the like. The portable electronic device 10 can generally correspond to a smart phone, music player, game player, video player, personal digital assistant (PDA), and/or the like.

Portable electronic device 10 includes a housing 100 configured to at least partially enclose any suitable number of components associated with portable electronic device 10. For example, housing 100 may enclose and internally support various electrical components (including integrated circuit chips and other circuitry) to provide computing operations for the device. In one embodiment, housing 100 is integrally formed in such as way as to constitute is a single complete unit. Housing 100 can be formed of any number of materials including for example plastics, metals, ceramics and the like.

Portable electronic device 10 also includes a cover glass 106 that has a planar outer surface. The outer surface can for example be flush with an edge 102 of the housing wall that surrounds the edge of the cover. Cover glass 106 cooperates with the housing 100 to enclose the portable electronic device 10. Although the cover glass 106 can be situated in a variety of ways relative to housing 100, in the illustrated embodiment, cover glass 106 is disposed within and proximate the mouth of the cavity of the housing 100. That is, cover 106 fits into an opening 108. In one embodiment, cover glass 106 is a protective top layer of transparent or semitransparent material (clear) such that underlying display screen 104 is visible therethrough. That is, the cover glass 106 can serve as a window for the display screen 104 (i.e., the transparent cover overlays the display screen). Display screen 104 can be used to display a graphical user interface (GUI) as well as other information to the user (e.g., text, objects, and graphics). Display screen 104 can be part of a display unit (not shown) that is assembled and contained within the housing 100. In one particular embodiment, cover 106 is formed from glass (e.g., cover glass), and more particularly highly polished glass. It should be appreciated, however, that other transparent materials such as clear plastic may be used. Cover glass 106 can include a hole to accommodate a user clickable input button 110 (home button) that can be used to provide a user input event to the portable electronic device 10.

Figure 1B:
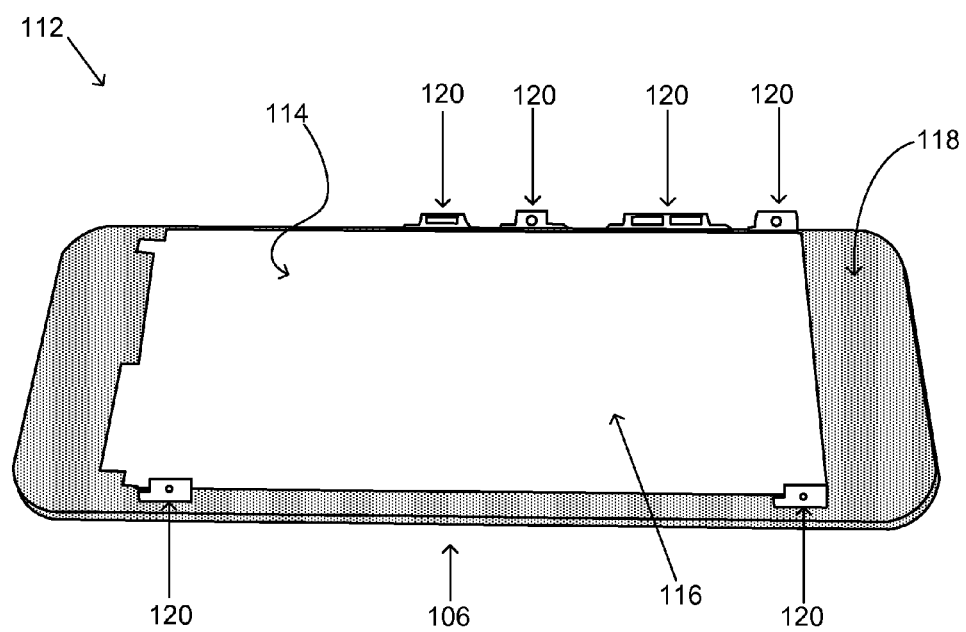
FIG. 1B shows a bottom-up view of a front panel assembly of the portable electronic device of FIG. 1A.

FIG. 1B shows a bottom up view of a front panel assembly 112 that has been disassembled from portable electronic device 10 of FIG. 1A. The bottom of front panel assembly 112 includes cover 106. Front panel assembly 112 includes display assembly 114 which can include display screen 104, one or more touch sensing layers (not shown) and a display assembly backing 116. Front panel assembly 112 also includes plastic frame 118 which supports cover 106 and display assembly 114. In some cases, plastic frame 118 is an injection molded plastic. Clips 120 are configured to engage with corresponding clips or receivers (not shown) positioned inside housing 100 to fasten front panel assembly 112 to housing 100. Clips 120 are positioned along plastic frame 118 at specified locations so that clips 120 can properly align with and engage with the corresponding clips (not shown) in housing 100. Clips 120 can be made of any material suitable for fastening front panel assembly 112 to housing 100. In some embodiments, clips 120 are made of a plastic material. Clips 120 can be made plastic material that is the same or different than plastic frame 118. In some embodiments, clips 120 are integral parts of plastic frame 118 as part of an injection molding process. In other embodiments, clips 120 are made of a different plastic material than plastic frame 118. For example, clips 120 can be made of a more rigid or flexible plastic than plastic frame 118 depending on the desired elastic qualities of each. In some embodiments clips 120 are made of metal which are embedded in plastic molded frame 118. As shown, clips 120 can vary in size and shape and can be located in non-symmetrical positions along plastic frame 118. Clips 120 can also each be made of different materials. For example, some clips 120 can be made of a plastic material and other clips 120 can be made of metal material.

Clips 120 can be embedded in plastic molded frame 118 using an insert molding process. During the insert molding process, clips 120 can be individually placed or loaded into a mold used in an injection molding process at specified locations corresponding to the desired locations in plastic frame 118. The mold will typically have two corresponding parts that together have a cavity shaped and sized to produce plastic frame 118. In some cases one side of the mold can have indentations or makings to indicate and/or secure the proper placement of clips 120 within the mold prior to the injection of plastic. After the plastic is injected into the mold, the plastic will harden and the location of clips 120 will become set. If any of clips 120 are not properly aligned or become misaligned during the loading procedure, the result can be a finished frame 118 that has improperly positioned clips 120. If the misalignment is above a specified tolerance, the finished frame is usually discarded, resulting in material waste and slow down of production. In addition, typically the two corresponding parts of the mold are tightly pressed together prior to the injection of plastic to assure that plastic does not leak out at the interface between the two halves of the mold. If any of clips 120 are misaligned in the mold prior to the pressing together of the two halves of the mold, clips 120 can mar or misshape portions of the mold, especially if clips 120 are made of a hard material such as metal. If the mold is damaged to badly, it will have to be repaired or discarded. The result is a loss of production time and increase overall cost of assembly due to the cost associated with the repair or replacement of the damaged mold.

Figure 2:
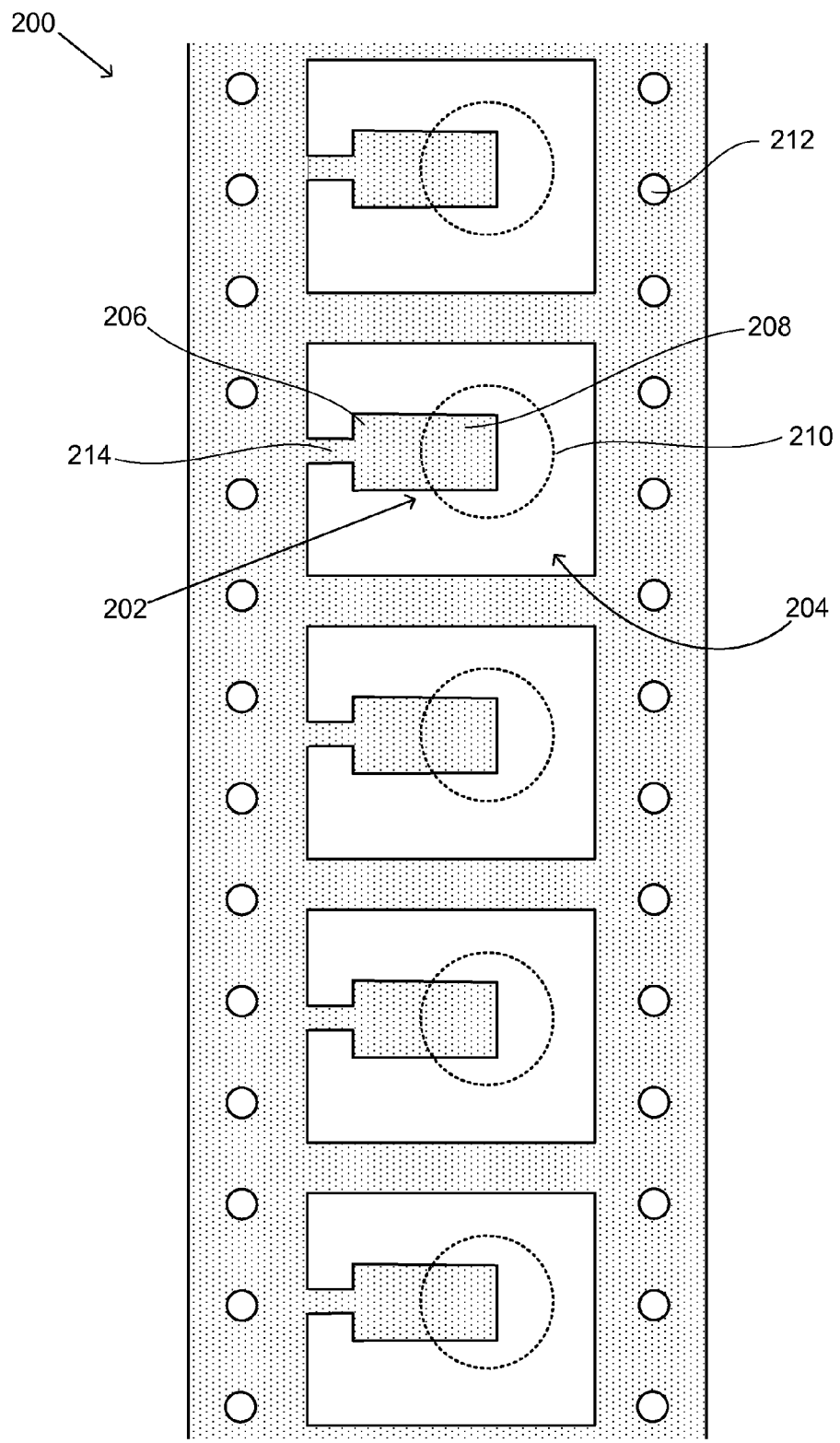
FIG. 2 shows a progressive lead frame used in an insert molding process to form a plastic and metal composite part.

In some insert molding processes, individual inserts can be manufactured using a progressive lead frame process. FIG. 2 shows a top-down view of a progressive lead frame 200 having a number of individual inserts 202. Lead frame 200 can be a strip of metal that has the desired shape inserts 202 and other features stamped out using a stamping process. Openings 204 are provided around each insert 202 to allow a mold to be placed around each insert 202 during an injection molding process. Lead frame 200 can have a number of feed holes 212 positioned at the lengthwise edges of lead frame 200 that are configured to engage with pins provided in a mechanical advancing device of an injection molding machine (not shown). During an injection molding process, lead frame 200 can be progressed by movement of the mechanical advancing device to position a first insert to be encased with a mold and insert molded. After the first insert is insert molded, the mechanical advancing device advances to position a second insert to be encased with a mold and insert molded. To help align inserts 202 properly with respect to the mold, feed holes 212 can also serve as alignment features to align inserts 202 with respect to the mold. For example, a vision or laser system can be used to locate one or more feed holes 212 to make sure proper alignment is achieved. During the injection molding process, plastic is injected into the mold and allowed to harden, thereby encasing part of each of inserts 202 to form a plastic and metal composite part. Dashed lines 210 indicate the perimeter of the injection molded plastic for each plastic and metal composite part.

As shown in FIG. 2, an anchor portion 208 of insert 202 is overmolded or encased in plastic 210 while an exterior portion 206 remains outside of the plastic 210. Connector 214 can be cut during the injection molding process when the two parts of the mold come together to encompass each of inserts 202. In this way, the injection molding process can also be used to remove the finished plastic and metal composite part that includes plastic portion 210 and insert 202. In some cases, portions of insert 202 can also be shaped or bent when the two parts of the mold come together. For example, exterior portion 206 of insert 202 can be bent at 90 degrees with respect to anchor portion 208 of insert 202. After a first insert is injection molded and cut from lead frame 200, the mechanical advancing device of the injection molding machine is advanced to position the next insert for injection molding. In this way, a number of inserts 210 can be insert molded in an assembly process.

Figure 3:
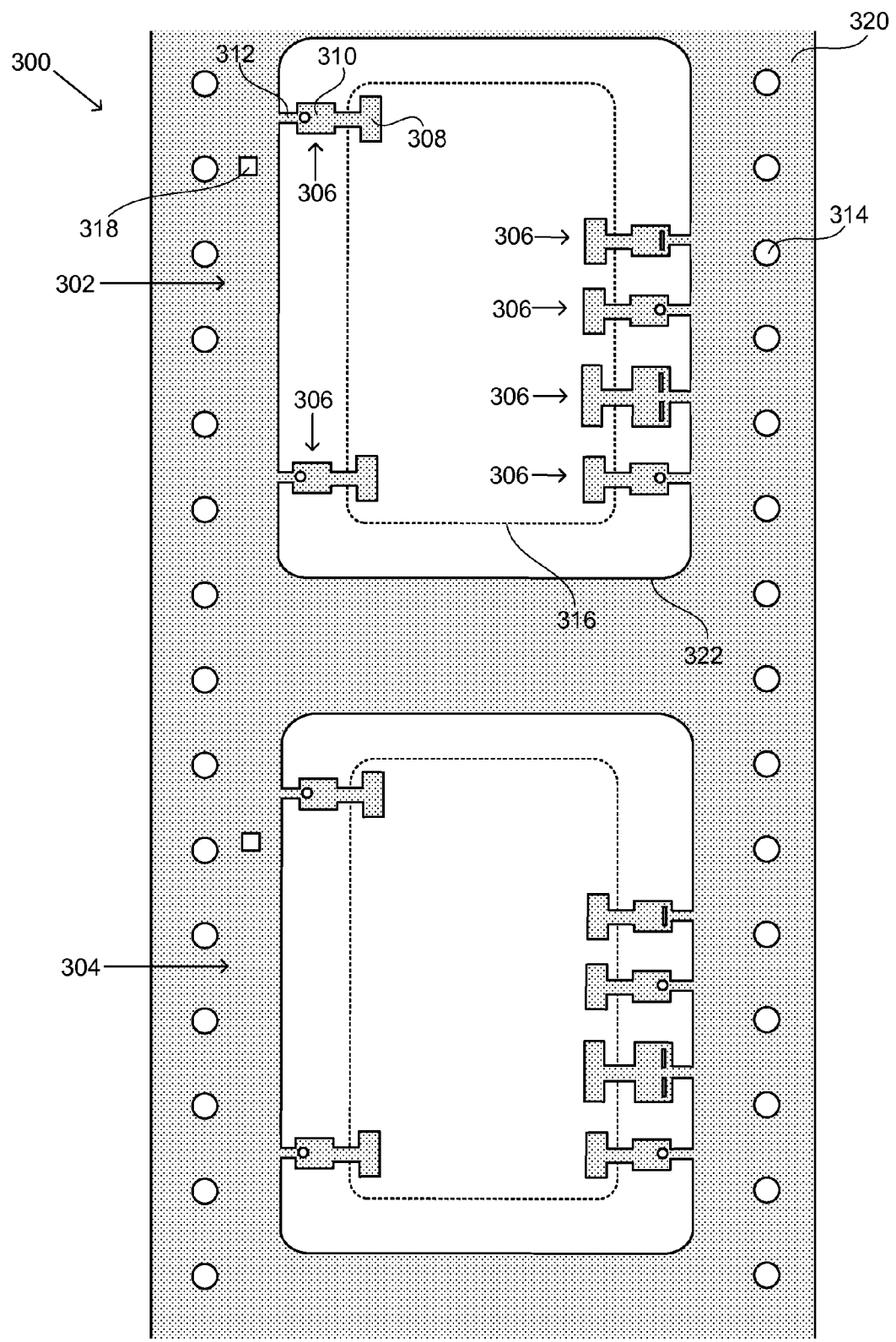
FIG. 3 shows a composite carrier frame assembly having inserts and a carrier frame made of the same material.

The progressive lead frame 200 of FIG. 2 described above is configured to create a plastic and metal composite part having a single metal insert 202. In some cases, such as with clips 120 in plastic frame 118 of FIG. 1B, more than one insert can be insert molded into a single plastic piece. For these instances, it can be advantageous to use a progressive lead frame that can accommodate a number of inserts. Such a progressive lead frame can be referred to as a composite carrier frame since it can accommodate multiple inserts. FIG. 3 shows a portion of composite carrier frame assembly 300 showing a first set 302 and a second set 304 of inserts 306. In some embodiments, inserts 306 are flat attachment features, such as the clips 120 of FIG. 1B. Inserts 306 each have an anchor portion 308 and exterior portion 310. Connector 312 attaches inserts 306 to carrier frame 320. In composite carrier frame assembly 300, inserts 306 and carrier frame 320 can be made of the same material. In some cases, inserts 306 and carrier frame 320 can be made of one contiguous sheet of material. Composite carrier frame assembly 300 can be made by stamping features into a sheet of material, such as a sheet of metal, with desired shapes and sizes using a stamping process. Opening 322 is provided in carrier frame 320 to accommodate the mold during the injection molding process. Anchor portions 308 can be positioned in opening 322 such that anchor portions 308 are positioned inside the mold during the injection molding process. An advantage of having inserts 306 attached to carrier frame 320 during the insert molding process compared to placing the inserts in individually into the mold is increased speed in which inserts 306 can be fed into the mold between injection molding cycles, thereby increase the overall production speed.

Composite carrier frame assembly 300 can have a number of feed holes 314 positioned at lengthwise edges of composite carrier frame assembly 300 that are configured to engage with pins provided in a mechanical advancing device of an injection molding machine (not shown) to advance composite carrier frame 300 between molding cycles. Mechanical advancing devices can include, for example, one or more sprockets or hydraulically and/or pneumatically driven mechanical devices. In one embodiment, feed holes 314 are arranged in rows parallel to the edges of carrier frame 320. During an injection molding process, composite carrier frame assembly 300 can be progressed by movement of the mechanical advancing device to position first set 302 to be encased with a mold, followed by positioning second set 304 to be encased with the mold. Feed holes 314 can also serve as alignment features to align the first 302 and second 304 sets of inserts 306 properly with respect to the mold. In some embodiments, index features 318 are also provided as a separate alignment features that can be used to align the first 302 and second 304 sets of inserts 306 properly during an injection molding process. A vision or laser system can be used to locate feed holes 314 and/or index features 318 to make sure proper alignment with the mold is achieved prior to the plastic injection process. Index features 318 can be in the form of, for example, holes stamped through composite carrier frame assembly 300 or protruding features that protrude from carrier frame 320. In some cases, more than one index feature 318 per set of inserts can be provided.

In some embodiments, it can be desirable to adjust the positions of or shape inserts 306 prior to the injection molding process. For example, in the final product, inserts 306 may be bent or shaped according to a desired design. In some cases, additional parts that are to be molded or partially molded into the final plastic piece, such as nuts and/or screws and fasteners, can be added to the composite carrier frame assembly 300. In some embodiments, the nuts and/or screws can be threaded and readily configured to accept matching parts. These additional parts can be at least partially injection molded into the injection molded part. Such additional parts can be added to composite carrier frame assembly 300 using any number of suitable methods such as welding (e.g., laser or spot welding) or use of adhesive. During an injection molding process, the two halves of a mold in the injection molding machine encase or close on the first set 302 of inserts 306 such that each anchor portion 308 is positioned inside the mold and each exterior portion 310 is positioned outside of the mold. In some embodiments, connector 312 is cut during the closure of the two halves of the mold. In addition, in some embodiments, exterior portion 310 is bent relative to anchor portion 308. For example, exterior portion can be bent at about 90 degrees with respect to anchor portion 308. In some embodiments, additional features such as holes, indentations and/or markings can be formed in the inserts 306. Next, plastic in liquid form is injected into the mold where the plastic is allowed to harden or cure. Dashed line 316 indicates the perimeter of the plastic portion. After the plastic is suitably hardened, the composite plastic and metal part can be removed from the composite carrier frame assembly 300. Then composite carrier frame assembly 300 can then be advanced by movement of the mechanical advancing device of the injection molding machine to position second 304 set of inserts for injection molding.

An advantage of having first 302 and second 304 sets of inserts 306 attached to composite carrier frame assembly 300 during the insert molding process compared to placing the inserts in individually into the mold is increased speed in which the inserts 306 can be fed into the mold between injection molding cycles. This arrangement increases the overall production speed of producing the composite plastic and metal part. In addition, since inserts 306 are pre-arranged in their correct positions relative to each other prior to the injection molding process, a step of arranging the individual inserts in proper positions in the mold is eliminated. That is, the process of per-arranging inserts 306 can be done prior to and independent from the injection molding process. Index feature 318 can then used to align the sets 302 and 304 of inserts 306 relative to the mold of the injection molding machine prior to injection of plastic. Furthermore, handling of composite carrier frame assembly 300 is much easier than the handling of individual insert pieces. In at least these ways, the use of composite carrier frame assembly 300 can increase the accuracy, speed and ease in which multiple inserts are molded into plastic parts compared to conventional methods.

In certain situations, it may be desirable to have multiple inserts positioned along different geometric planes in a single plastic part. To accomplish this, in some embodiments, more than one composite carrier frame can be simultaneously fed into an injection molding machine. That is, an injection molding machine can be configured to accept two or more composite carrier frames. In some configurations, the injection molding machine is configured to feed two or more composite carrier frames in a parallel configuration with respect to each other. The result is a plastic and metal composite part with multiple sets of inserts that are positioned along different parallel geometric planes.

Figure 4:
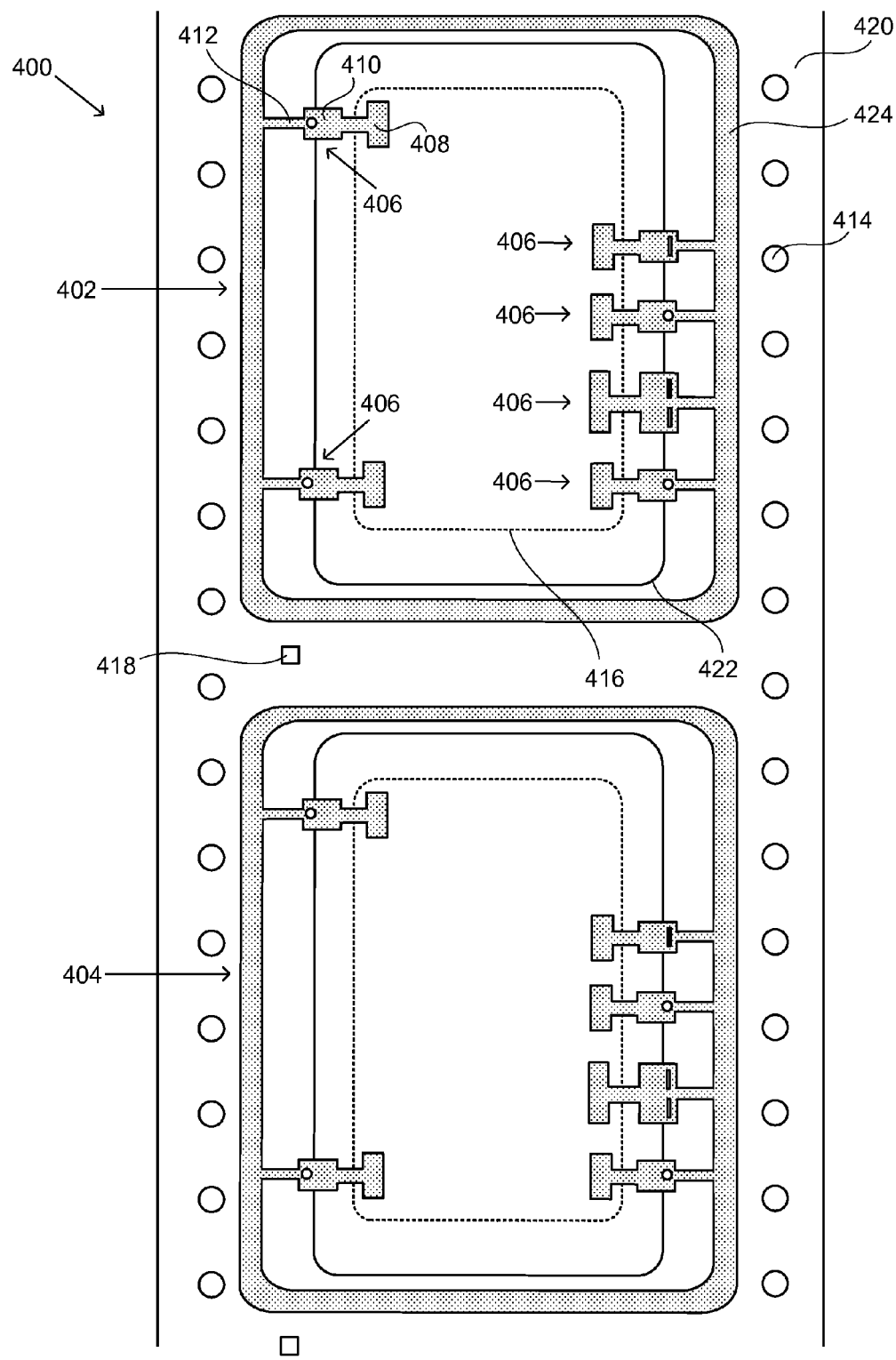
FIG. 4 shows a composite carrier frame assembly having inserts and a carrier frame made of different materials.

In some embodiments, it can be desirable to have a composite frame that is made of a different material than the inserts. FIG. 4 shows a portion of composite carrier frame assembly 400 having a composite frame 420 that can be made out of a different material than inserts 406. Composite carrier frame assembly 400 has a first set 402 and a second set 404 of inserts 406. Inserts 406 can each have an anchor portion 408 and exterior portion 410. Inserts 406 are connected to mount 424, which in turn can be attached to carrier frame 420 using any suitable technique such as welding (e.g., spot or laser) or by use of an adhesive. The method of attachment of mount 424 to carrier frame 420 can depend on the materials of mount 424 and carrier frame 420. For example, in some embodiments, mount 424, connector 412, inserts 406 and anchor portions 408 are made of metal while carrier frame 420 is made of a non-metal material such as plastic. In some embodiments carrier frame 420 is made of a less expensive material than mount 424, connector 412, inserts 406 and anchor portions 408. In this way, the overall cost of producing composite carrier frame assembly 400 can be less than if the entire composite structure were made of a single more expensive material. In some cases, carrier frame 420 can be reused where additional sets of mounts, connectors, inserts and anchor portions are attached to the carrier frame after an injection molding process. Mount 424, connector 412, inserts 406 and anchor portions 408 can be made by stamping features with desired shapes and sizes using a stamping process. Opening 422 is provided in carrier frame 420 to accommodate the mold during the injection molding process. Anchor portions 408 can be positioned in opening 422 such that anchor portions 408 are positioned inside the mold during the injection molding process.

Composite carrier frame assembly 400 can have a number of feed holes 414 positioned at lengthwise edges of composite carrier frame assembly 400 that are configured to engage with pins provided in a mechanical advancing device of an injection molding machine (not shown). In one embodiment feed holes 414 are arranged in rows parallel to the edges of carrier frame 420. During an injection molding process, composite carrier frame assembly 400 is progressed by movement of the mechanical advancing device to position the first 402 and second 404 sets of inserts 406 in progressive injection molding processes. Feed holes 414 can also serve as alignment features to align the first 402 and second 404 sets of inserts 406 properly with respect to the mold. In some embodiments, index features 408 are also provided as a separate alignment features that can be used to align the first 402 and second 404 sets of inserts 406 properly during an injection molding process. A vision or laser system can be used to locate feed holes 414 and/or index features 418 to make sure proper alignment is achieved prior to the plastic injection process. Index features 418 can be in the form of, for example, holes stamped through carrier frame 420 or protruding features that protrude from carrier frame 420. In some cases, more than one index feature 418 per set of inserts can be provided.

In some embodiments, it can be desirable to adjust the positions of or shape inserts 406 prior to the injection molding process. Additional parts that are to be molded or partially molded into the final plastic piece, such as nuts and/or screws and fasteners, can be added to the composite carrier frame assembly 400. Such additional parts can be added to composite carrier frame assembly 400 using any number of suitable methods such as welding (e.g., laser or spot welding) or use of adhesive. During an injection molding process, the two halves of a mold in the injection molding machine encase or close on the first set 402 of inserts 406 such that each anchor portion 408 is positioned inside the mold and each exterior portion 410 is positioned outside of the mold. In some embodiments, connector 412 is cut during the closure of the two halves of the mold. In addition, in some embodiments, exterior portion 410 is bent relative to anchor portion 408. For example, exterior portion can be bent at about 90 degrees with respect to anchor portion 408. In some embodiments, additional features such as holes, indentations and/or markings can be formed in the inserts 408. Next, plastic in liquid form is injected into the mold where the plastic is allowed to harden or cure. Dashed line 416 indicates the perimeter of the plastic portion. After the plastic is suitably hardened, the composite plastic and metal part can be removed from the composite carrier frame assembly 400. Then composite carrier frame assembly 400 can then be advanced by movement of the mechanical advancing device of the injection molding machine to position second 404 set of inserts for injection molding.

Figure 5:
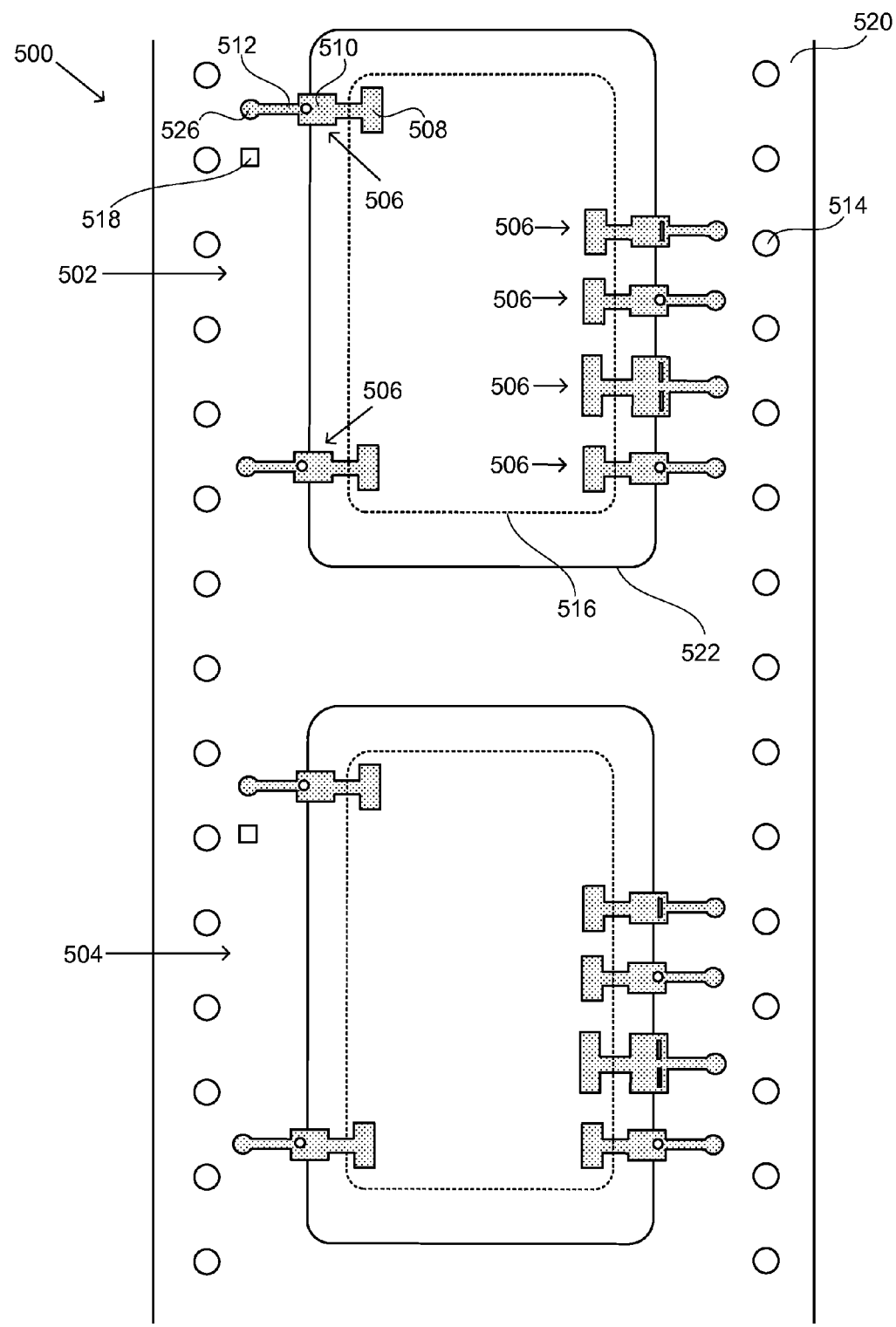
FIG. 5 shows a composite carrier frame assembly having inserts that are individually attached to a carrier frame.

In some embodiments, a composite carrier frame having individually positioned inserts can be provided. FIG. 5 shows a portion of composite carrier frame assembly 500 having a composite frame 520 having individually attached inserts 506. Composite carrier frame assembly 500 has a first set 502 and a second set 504 of inserts 506. Inserts 506 can each have an anchor portion 508 and exterior portion 510. Connectors 512 attach inserts 506 to tabs 526, which are in turn attached to carrier frame 520. Tabs 526 can be attached to carrier frame 520 using any suitable technique such as welding (e.g., spot or laser) or by use of an adhesive. The method of attachment of tabs 526 to carrier frame 520 can depend on the materials of tabs 526 and carrier frame 520. For example, in some embodiments, tabs 526, connectors 512, inserts 506 and anchor portions 508 are made of metal while carrier frame 520 is made of a non-metal material such as plastic. In some cases, carrier frame 520 can be reused where additional sets of tabs, connectors, inserts and anchor portions are attached to the carrier frame after an injection molding process. Each of tabs 526, connectors 512, inserts 506 and anchor portions 508 can be made as individual pieces using a stamping process. Opening 522 is provided in carrier frame 520 to accommodate the mold during the injection molding process. Anchor portions 508 can be positioned in opening 522 such that anchor portions 508 are positioned inside the mold during the injection molding process.

Composite carrier frame assembly 500 can have a number of feed holes 514 positioned at lengthwise edges of composite carrier frame assembly 500 that are configured to engage with pins provided in a mechanical advancing device of an injection molding machine (not shown). In one embodiment, feed holes 514 are arranged in rows parallel to the edges of carrier frame 520. During an injection molding process, composite carrier frame assembly 500 is progressed by movement of the mechanical advancing device to position the first 502 and second 504 sets of inserts 506 to be encased with a mold. Feed holes 514 can also serve as alignment features to align the first 502 and second 504 sets of inserts 506 properly with respect to the mold. In some embodiments, index features 508 are also provided as a separate alignment features that can be used to align the first 502 and second 504 sets of inserts 506 properly during an injection molding process. A vision or laser system can be used to locate feed holes 514 and/or index features 518 to make sure proper alignment is achieved prior to the plastic injection process. Index features 518 can be in the form of, for example, holes stamped through carrier frame 520 or protruding features that protrude from carrier frame 520. In some cases, more than one index feature 518 per set of inserts can be provided.

In some embodiments, it can be desirable to adjust the positions of or shape inserts 506 prior to the injection molding process. Additional parts that are to be molded or partially molded into the final plastic piece, such as nuts and/or screws and fasteners, can be added to the composite carrier frame assembly 500. Such additional parts can be added to composite carrier frame assembly 500 using any number of suitable methods such as welding (e.g., laser or spot welding) or use of adhesive. During an injection molding process, the two halves of a mold in the injection molding machine encase or close on the first set 502 of inserts 506 such that each anchor portion 508 is positioned inside the mold and each exterior portion 510 is positioned outside of the mold. In some embodiments, connector 512 is cut during the closure of the two halves of the mold. In addition, in some embodiments, exterior portion 510 is bent relative to anchor portion 508. For example, exterior portion can be bent at about 90 degrees with respect to anchor portion 508. In some embodiments, additional features such as holes, indentations and/or markings can be formed in the inserts 508. Next, plastic in liquid form is injected into the mold where the plastic is allowed to harden or cure. Dashed line 516 indicates the perimeter of the plastic portion. After the plastic is suitably hardened, the composite plastic and metal part can be removed from the composite carrier frame assembly 500. Then composite carrier frame assembly 500 can then be advanced by movement of the mechanical advancing device of the injection molding machine to position second 504 set of inserts for injection molding.

Figure 6:
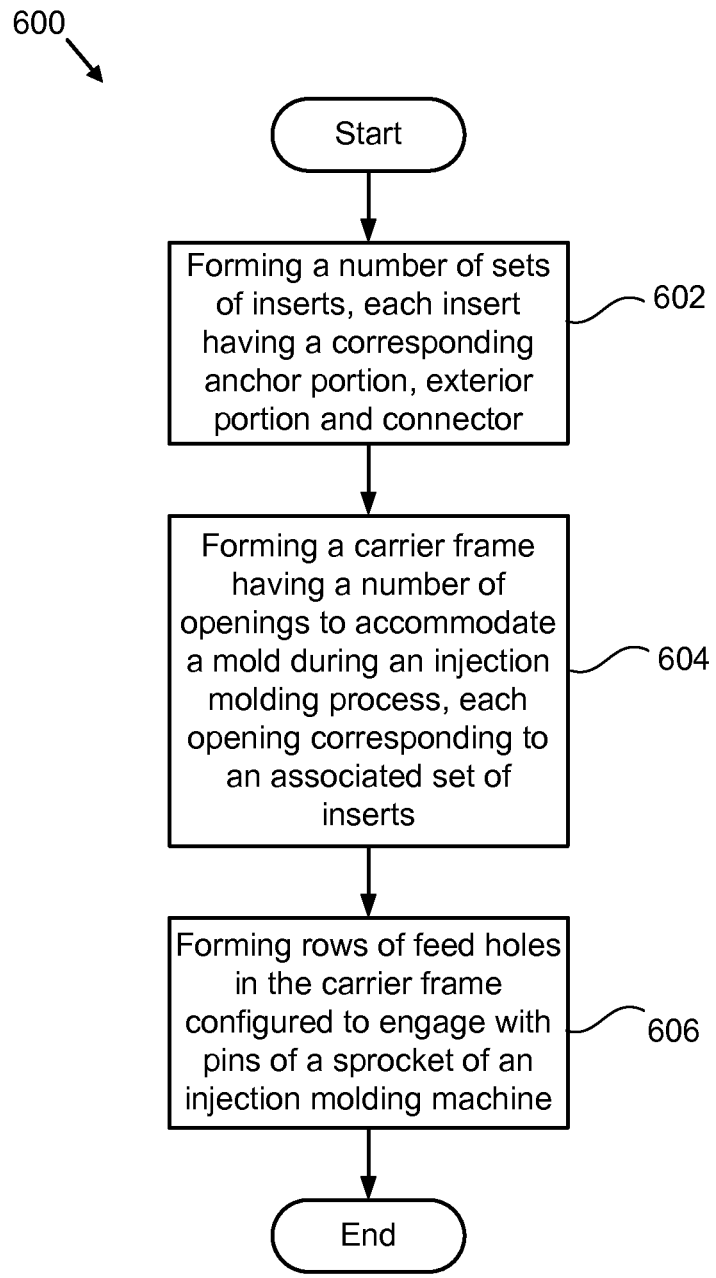
FIG. 6 shows a flowchart indicating steps for forming a composite carrier frame assembly.

Described herein are methods for forming a composite carrier frame assembly, such as the composite carrier frame assemblies of FIGS. 3-5. FIG. 6 is a flow chart showing steps involved in an embodiment for forming a composite carrier frame assembly. At 602, a number of sets of inserts are formed. The sets of inserts can be formed using a stamping process where features corresponding to the shape and size of the inserts are stamped in the carrier frame. For example, in composite carrier frame 300 of FIG. 3, inserts 306 can be stamped into carrier frame 320. In some cases the sets of inserts and the carrier frame are formed in separate processes. Each insert can have a corresponding anchor portion, exterior portion and connector. As described above, each anchor portion can be arranged to be molded in the single injection molded part and each exterior portion can be arranged to be positioned exterior to the single injection molded part.

At 604, a carrier frame is formed. The carrier frame can have a number of openings, each opening configured to accommodate a mold during an injection molding process. Each opening also corresponds to an associated set of inserts, where each insert is positioned in the opening such that each anchor portion is situated inside a mold and each exterior portion is situated outside of the mold during the injection molding process. The carrier frame can be formed from a strip of material. As described above, the carrier frame and the sets of inserts can be formed in different processes. For example, in composite carrier frame 400 of FIG. 4 inserts 406 can be stamped from a sheet of material, such as sheet of metal, and carrier frame 420 can be made in separate process. Carrier frame 420 can be made, for example, from strip of plastic material with opening 422, index feature 418 and feed holes 414 stamped out using a stamping process. In some embodiments carrier frame 420 can be made of the same or different metal material than inserts 406.

At 606, a number of feed holes are formed in the carrier frame. The feed holes can be arranged in rows parallel to edges of the carrier frame. The rows of feed holes can be configured to engage with pins of a mechanical advancing device of an injection molding machine. As described above, movement of the mechanical advancing device causes the feed holes to engage with the pins to progress the composite carrier frame assembly though the injection molding machine during an injection molding process such that one set of inserts is injection molded into a single injection molded part at a time. In some embodiments, a number of index holes corresponding to each set of inserts are formed. Each index feature can be configured to align its corresponding set of inserts to reference points during the injection molding process. In some embodiments, features in at least a portion of the inserts are formed. Features can include, for example, additional holes, an indentations and bends.

In some cases, it may also be advantageous to adjust the positions of at least one or more of the inserts prior to feeding the composite carrier frame assembly into an injection molding machine for injection molding. For example, if it is determined by inspection that one or more of the inserts are not aligned according to a pre-determined alignment specification, the one or more misaligned inserts can be repositioned or bent such that they become suitably aligned. The inspection can be done using any suitable methods including visual inspection by eye or machine inspection using, for example, a laser or vision system apparatus.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for forming a composite carrier frame assembly used in an injection molding process, the injection molding process utilizing an injection molding machine with a mold, the method comprising:
    forming a set of inserts, the set of inserts including a peripheral mount coupled to inserts arranged at fixed positions with respect to each other, each of the inserts including an anchor portion and an exterior portion;
    forming a carrier frame that includes openings and feed holes, the openings configured to accommodate the mold and the feed holes arranged in rows proximate to edges of the carrier frame, the feed holes configured to engage with an advancing device that advances the carrier frame with respect to the mold; and
    coupling the set of inserts to the carrier frame such that the peripheral mount surrounds one of the openings and each of the inserts is within the one of the openings, wherein the anchor portion of each of the inserts is arranged to be inside of the mold and the exterior portion of each of the inserts is arranged to be outside of the mold during the injection molding process.

2. The method of claim 1, wherein the set of inserts is comprised of metal.

3. The method of claim 1, wherein the set of inserts and the carrier frame are comprised of different materials.

4. The method of claim 1, wherein the peripheral mount has a perimeter that is larger than a perimeter of the one of the openings.

5. The method of claim 1, wherein each opening of the carrier frame is coupled with an associated set of inserts, the method further comprising:
    forming index holes within the carrier frame, the index holes configured to align each set of inserts during the injection molding process.

6. The method of claim 1, further comprising:
    forming features in at least a portion of the inserts, the features including a hole, an indentation, a bend or a combination thereof.

7. The method of claim 1, wherein the exterior portions of each set of inserts has at least two different shapes configured to couple with corresponding receivers of another part.

8. The method of claim 1, wherein the exterior portions of at least one of the inserts includes an engagement feature that is accessible for engaging with another part after the injection molding process.

9. The method of claim 8, wherein the engagement feature is a hole.

10. The method of claim 1, wherein the set of inserts includes inserts made of at least two different materials.

11. The method of claim 1 wherein the set of inserts comprises an insert that includes a nut, a screw or a fastener.

12. A method for forming a carrier frame assembly used in an injection molding process, the injection molding process utilizing an injection molding machine with a mold, the method comprising:
    forming a carrier frame that includes openings and feed holes, the openings configured to accommodate the mold and the feed holes arranged in rows proximate to edges of the carrier frame, the feed holes configured to engage with an advancing device that advances the carrier frame with respect to the mold, wherein one of the openings includes:
        a set of clips with each clip positioned within the one of the openings, each clip having an anchor portion arranged to be inside of the mold and an exterior portion arranged to be outside of the mold during the injection molding process, the set of clips arranged at opposing sides of the one of the openings such that the exterior portions are positioned at opposing sides of a resulting molded part, the exterior portions including engagement features to secure the opposing sides of the resulting molded part with another part.

13. The method of claim 12, wherein the set of clips is coupled with a mount, the method further comprising:
    coupling the set of clips with the carrier frame via the mounts.

14. The method of claim 13, wherein coupling the set of clips with the carrier frame includes a welding process, use of an adhesive, or both.

15. The method of claim 12, wherein the carrier frame and the set of clips are formed of the same material and forming the carrier frame comprises a stamping process.

16. The method of claim 12, wherein the engagement features comprise holes.

17. The method of claim 12, wherein each set of clips includes clips having exterior portions with at least two different shapes.

18. A method of forming a composite part from a carrier frame used in an injection molding process, the method comprising:

forming the carrier frame that includes openings configured to accommodate a mold during the injection molding process, wherein the openings includes one opening that defines a set of inserts, each insert having an anchor portion and an exterior portion that includes an engagement feature;

positioning the mold within the one opening such that the anchor portion of each insert is positioned within the mold and the exterior portion of each insert is positioned outside of the mold, wherein the set of inserts are arranged at opposing sides of the one opening; and forming the composite part by injecting a resin within the mold such that the anchor portion of each insert resides within the resin and the exterior portion of each insert is accessible from outside the resin, wherein exterior portions of the set of inserts are arranged at opposing sides of the composite part such that the engagement features secure the opposing sides of the composite part with another part.

19. The method of claim 18, wherein positioning the mold includes positioning two parts of the mold together within the opening, wherein positioning the two parts of the mold together includes bending at least one insert.

20. The method of claim 19, wherein bending the at least one insert includes bending a corresponding exterior portion by about ninety degrees with respect to a corresponding anchor portion of the at least one insert.

21. The method of claim 18, wherein the engagement feature is a hole.

22. The method of claim 18, wherein the carrier frame includes feed holes arranged in rows parallel to edges of the carrier frame, wherein the feed holes engage with an advancing device that advances the carrier frame with respect to the mold.

23. The method of claim 18, wherein the carrier frame include a strip of material, wherein the set of inserts includes a peripheral mount that is coupled to the strip of material, the peripheral mount having a perimeter that is larger than a perimeter of the one opening.

24. The method of claim 23, wherein the strip of material is made of a different material than the set of inserts.

* * * * *